Patented June 19, 1934

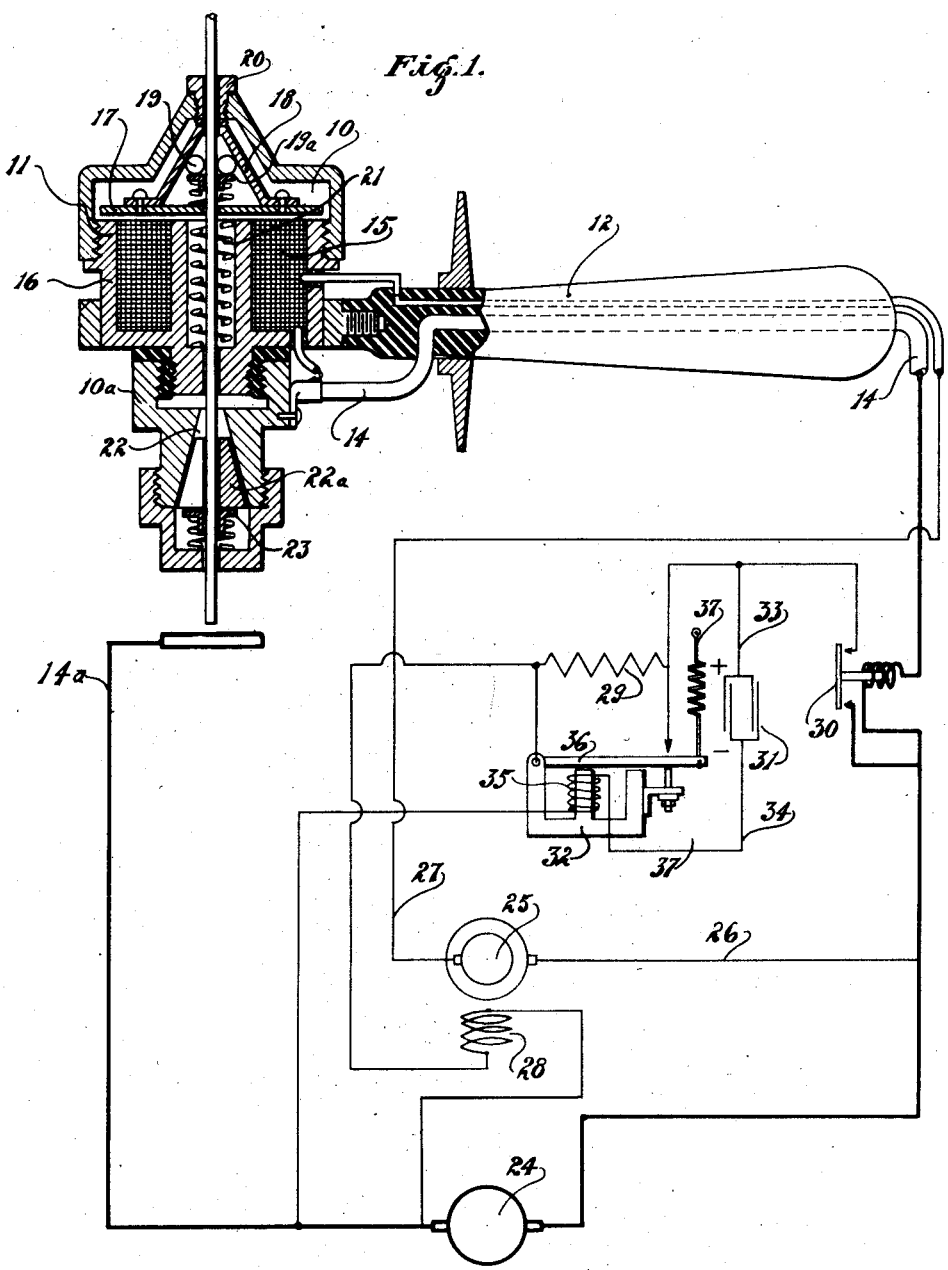

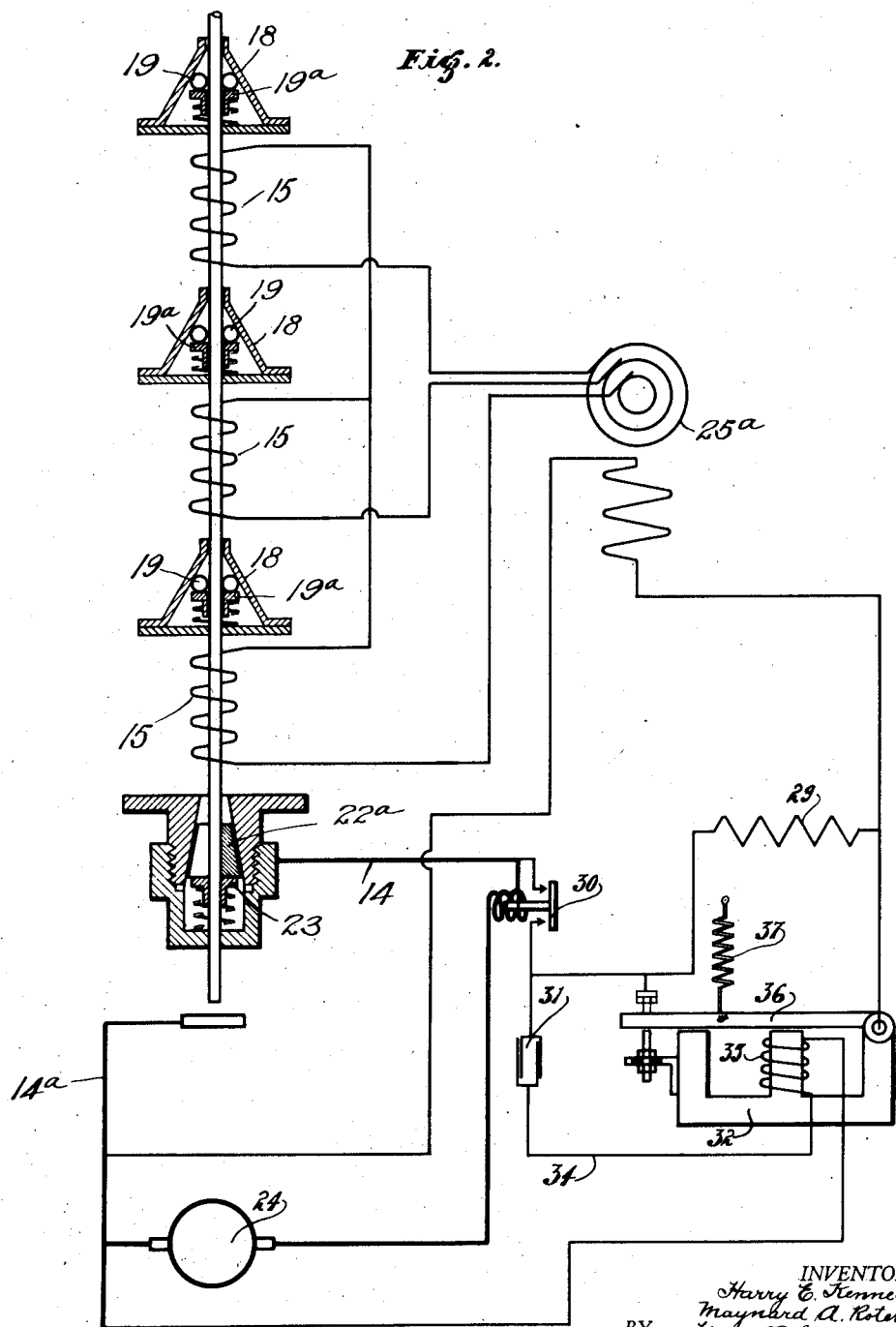

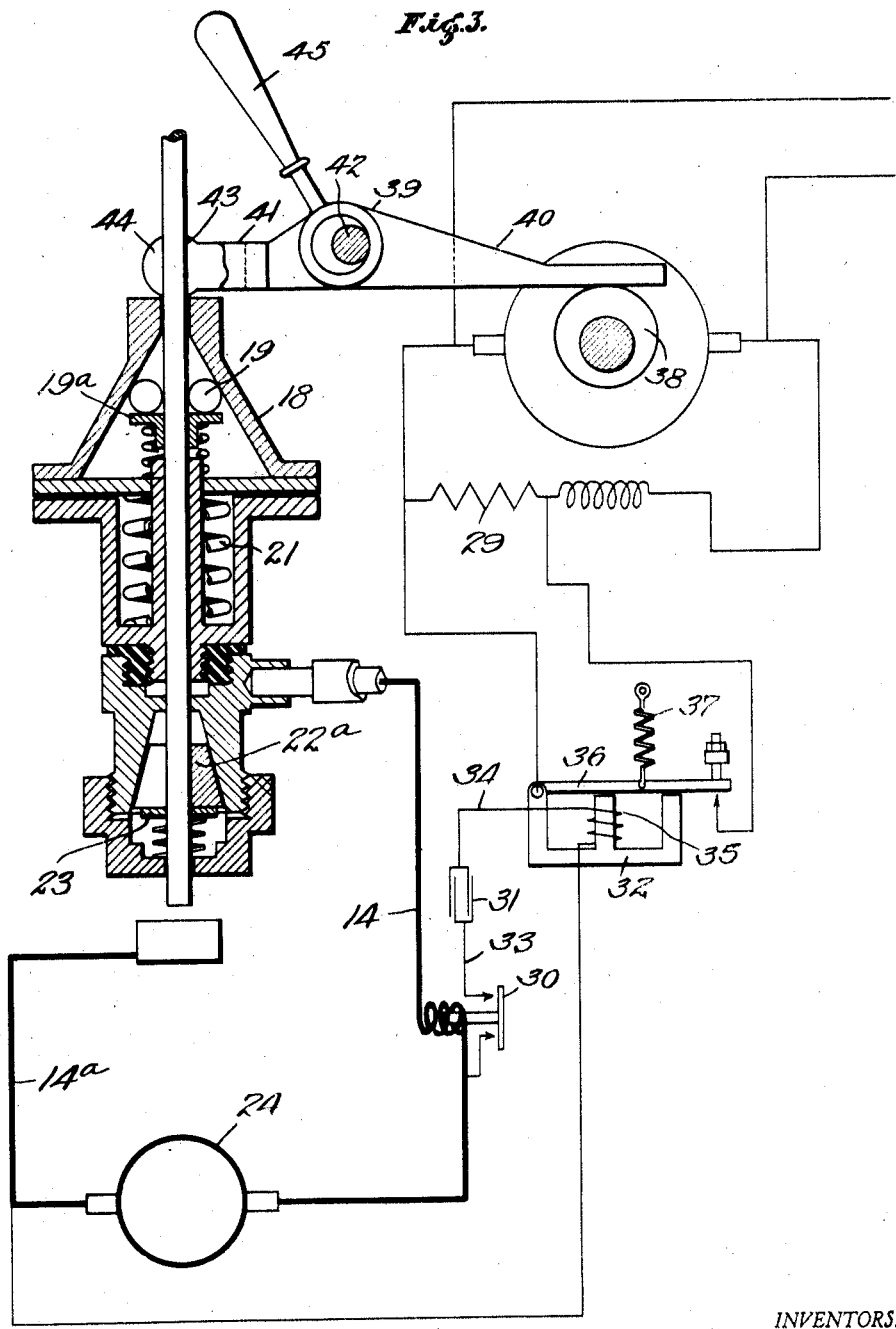

1,963,915

UNITED STATES PATENT OFFICE

1,963,915

WELDING APPARATUS

Harry E. Kennedy, Maynard A. Rotermund and Lloyd T. Jones, Berkeley, Calif., assignors to Union Carbide and Carbon Research Laboratories, Inc., a corporation of New York Application October 19, 1931, Serial No. 569,638

26 Claims. (Cl. 219—8)

This application is a continuation in part of our copending application entitled "Method of maintaining a constant arc length in electric welding", filed October 22, 1930 and bearing Ser. No. 490,436.

The invention relates to electric welding and particularly pertains to an arc welding apparatus which includes an automatic control for advancing the welding rod at substantially the rate of its consumption and consequently maintaining an arc of a uniform length.

In our prior application we have pointed out that in electric welding the heat generated by the arc forms a globule at the end of the welding rod which rapidly increases in size and becomes unstable. If the arc is of a proper length, the globule is properly deposited on the work and during its deposition momentarily bridges the gap between the welding rod and the work, short circuiting the arc. In the application referred to we disclose a method and apparatus utilizing the frequency of the metallic depositions between the electrodes and their concomitant influence on an electrical circuit for automatically regulating the arc length to maintain it uniformly short.

The present invention has for its principal object the provision of an improved efficient electric welding apparatus capable of maintaining an arc of a uniform length by automatically feeding the welding rod toward the work at the rate of its consumption, this being accomplished by utilizing the influence of the frequency of metallic deposition between the electrodes on an electrical control circuit.

In the preferred embodiment of our invention which is herein disclosed we have provided a hand tool for supporting the welding rod, which tool is of dimensions and weight enabling it to be efficiently manipulated by an operator. The arc circuit is connected with the welding rod through the hand tool and to the work. The hand tool is fitted with an electromagnetic welding rod feeding device which advances the rod only during one portion of its cycle of operation. This feeding mechanism is influenced by a control circuit associated with the arc circuit. This control circuit is influenced by the short circuiting effect of the globular movement between the electrodes to actuate the electromagnetic feeding device and advance the welding rod at the same rate as its consumption.

The invention is exemplified in the following description and illustrated by way of example in the accompanying drawings, in which:

Fig. 1 illustrates a welding rod carrying tool in central section and the wiring diagram of the arc and control circuit connected with the tool.

Fig. 2 illustrates a modified form of hand tool for carrying the welding rod.

Fig. 3 diagrammatically illustrates the invention as embodied in a fuel automatic welding apparatus.

In the drawings we have illustrated the welding rod feeding mechanism as embodied in a hand tool 10 of dimensions and weight enabling it to be conveniently and efficiently manipulated by an operator. The feeding mechanism, however, need not be embodied in an apparatus which is portable in the same sense as a hand tool. That is to say, we are mainly concerned with an electrically controlled device for accurately feeding the rod in one direction at a rate of advance equalling the rate of consumption of the rod. We do, however, realize that a hand tool such as disclosed has considerable merit and a wide field for use in connection with arc welding both in connection with our type of automatic control and others. Some of the novel features of the feeding device, however, may be employed without embodying them in a hand tool.

The hand tool 10 includes a cylindrical metallic body 11 having a projecting handle 12 to which one conductor 14 of an arc welding circuit is connected. A coil 15 is wound about a hollow spool 16 arranged coaxially of the body 11 in a fixed position relative thereto. Mounted for reciprocation at one end of the coil 15 is the armature 17 of the magnet. This armature is formed with a conical cage 18 arranged coaxially of the spool 16. The tapered interior of this cage cooperates with three balls 19 and a ball retainer 19a to form a one-way clutch. That is, the welding rod is projected axially through the cage 18 and spool 16 and when the armature is reciprocated the one-way clutch advances the rod on alternate strokes but does not affect its position on the opposite strokes. Thus, the rod is fed in one direction in increments of advance. The length of the stroke of the armature and hence the increment of advance of the rod may be adjusted by altering the position of an adjusting nut 20 which acts to limit the movement of the armature away from the coil. The armature is moved in this direction by means of a spring 21 mounted concentrically within the spool 16.

The welding current from the conductor 14 is led to the welding rod through the handle 12, the body 10a and thence through inner and outer cones 22a and 22. The inner cone 22a is segmental and is in contact with the welding rod. The conical surfaces of the inner and outer cones cooperate to prevent retraction of the rod through the feeding device. That is, when the armature is attracted to the coil the ball clutch advances the rod and the cones prevent retraction of the rod on the return stroke of the armature.

A spring pressed member 23 is provided to maintain the segments of the inner cone in contact with the rod and with the outer cone.

The electromagnetic feeding device just described is operated through the medium of a single phase impulse generator as will be hereinafter pointed out in connection with the arc welding and control circuits.

We are aware, however, that the feeding mechanism may include say three such magnetic feeding devices engaging the same welding rod and operating in overlapping cycles being furnished with the proper energy through the medium of a polyphase impulse generator 25a. Such an arrangement is illustrated in Fig. 2 and operation thereof will be apparent from the drawings and from the description of the operation of the device illustrated in Fig. 1.

In Fig. 2 of the drawings three one way clutches and the electromagnetic actuating means are illustrated diagrammatically. As these clutches are constructed and operated as illustrated in Fig. 1 of the drawings, the same reference characters have been applied to the parts shown in Fig. 2. The one way clutches are located one above another, as shown in Fig. 2 and as explained in connection with Fig. 1, they operate to positively feed the welding bar downwardly and they directly engage the welding bar in the downward feeding thereof.

We have disclosed our clutching mechanism as being actuated magnetically. It is to be understood, however, that it is within the scope of the present invention to actuate such a one-way clutch for advancing the welding rod through the medium of eccentrics or other similar or mechanical devices actuated by a motor or other electrical apparatus as illustrated in Fig. 3.

The one way clutch illustrated in Fig. 3 of the drawings is of the same construction as the one way clutch shown in Fig. 1, as indicated by the same reference characters being applied to similar parts. Instead of actuating the one way clutch electro-mechanically for a downward feeding movement of the welding rod, however, a rotary motor actuated eccentric 38 and oscillatory lever 39 are employed. The lever 39 is fulcrumed at a point intermediate the ends thereof on an adjustable pivot 42 so as to form two arms 40 and 41, the relative lengths of which arms may be varied by adjusting the eccentric pivot 42. The end of the arm 40 of the lever 39 rests upon the surface of the eccentric 38, and the end 44 of the arm 41 is provided with an aperture 43 through which the welding rod passes. As shown in Fig. 3, the end 44 of the arm 41 is at its lowermost position and bearing against the upper end of the conical-shaped cap 18. In this position the force applied by the arm 41 is acting against the tension of the spring 21 and the welding rod has just been fed one increment of advance toward the work. When the eccentric 38 is rotated one-half of a revolution the end 44 of the arm 41 will be raised to its uppermost position and the tension of the spring 21 will also cause the conical-shaped cap 18 to move upward. The welding rod will be held against upward movement by the one way clutch. During the next half of a revolution of the eccentric 38, the arm 41 will force the cap 18 downward and the one way clutch will be effective to move the welding rod another increment of advance toward the work. The distance of the increments of advance may be varied by adjusting the eccentric pivot 42 by means of an operating arm 45. It will thus be seen that either mechanical or electro-mechanical means may be employed for feeding the welding rod toward the work.

For operating and controlling the welding rod carrying and feeding devices previously described we provide electrical circuits such as illustrated in Fig. 1. The arc circuit, of course, includes the conductor 14 connected to one terminal of an arc generator 24 which is led to the welding rod through the hand tool for supporting the welding rod as previously described. This hand tool, as previously described, is fitted with a handle and we may prefer to lead the conductor through the handle of the tool. The other terminal of the arc 24 or that indicated by the numeral 14a is led to the work.

A bipolar alternating current generator 25 is provided which is driven at a constant speed in any preferred manner. We prefer that this alternator 25 be driven at a speed of 1200 R. P. M. Under normal operation forty impulses per second will be transmitted therefrom to the coil 15 of the actuating electromagnet of the hand tool 10. The alternator is connected by a conductor 26 to the conductor 14 for electrical connection to one terminal of the coil 15. The alternator is also connected by a conductor 27 to the other terminal of the coil. This latter conductor in practice consists of a separate wire conveniently woven integral with the main welding cable which may connect with the hand tool through the handle thereof.

The field 28 of the alternator 25 is in series with a resistance 29 and the field and resistance are interposed across the arc generator conductors 14 and 14a.

A control circuit is provided which includes a contactor 30, a condenser 31 and a relay 32 of any suitable type. One terminal of the contactor is connected by a conductor 33 to the condenser 31 the latter being in turn connected by a conductor 34 to one terminal of the coil 35 of the relay 32. The other terminal of this coil is connected to the conductor 14a. The contactor 30 is interposed between the conductor 14 and the conductor 33 so that when the arc is struck, the contactor 30 will close, electrically connecting the conductor 33 to the conductor 14.

The capacity of the condenser 31 and the inductance of the relay 32 are adjusted to give certain desirable characteristics to the impulses of current which pass the condenser. When the voltage across the arc is say twenty volts, the condenser is charged to a like potential. During the charging of the condenser a current will flow through the coil 35 of the relay 32. When the arc is short circuited by a metallic deposition between the welding rod and the work, the condenser is discharged through the arc and through the relay coil 35. The constants of the condenser and the relay are such that during the charge or discharge of the condenser the current in the coil 35 of the relay causes the bar 36 of the relay to operate in the usual manner, the bar 36 being returned to normal position through the medium of a spring 37. The relay acts to close an auxiliary circuit which short circuits the resistance 29 to remove the same from the field circuit of the alternator 25.

The constants of the condenser and the relay provide that the impulses operating the relay shall be of equal magnitude whether the arc be long or short and whether the time of deposition of a metallic globule between the welding rod and work be long or short.

It is, of course, understood that the alternating current impulses generated by the alternator 25 are sufficient to energize the coil of the electromagnetic welding rod feed mechanism to attract the armature and advance the rod when the resistance 29 is short circuited but when this resistance 29 is part of the field circuit of the alternator 25, the impulses thereof are insufficient to energize the coil sufficiently to attract the armature and advance the rod.

When the arc is short and the metallic depositions are frequent, the field 28 of the alternator is sufficiently weak, due to the interposition of the resistance 29 into the field circuit of the alternator 25, that the coil of the magnetic feeding mechanism will not be sufficiently energized to attract the armature and feed the welding rod.

When the arc becomes long, the metallic depositions are fewer and the resistance 29 is shorted out more frequently through the medium of the relay 32. The impulses of the alternator 25 are then more frequently strong enough to advance the welding rod through the medium of the electromagnetic feeding device of the hand tool.

The shortness of arc or frequency of depositions to which the relay 32 will respond may be adjusted by altering the tension of the spring 37.

In operation of the apparatus, welding wire is cut into lengths of thirty-six or forth-eight inches which is about the length that may be consumed before the operator of the welding apparatus desires to change his position. This length of welding rod or wire is inserted through the hand tool 10 and the operator is then ready to strike his arc and proceed in the usual manner.

The current impulses from the alternator 25 will energize the coil 15 and it will attract its armature. As this armature is fitted with a one-way clutch, reciprocation thereof will advance the welding rod toward the work in increments of advance.

The moment the arc is struck, the control circuit, which is in parallel with the arc, will be electrically connected to the arc circuit through the contactor 30 so that the individual metallic depositions occurring in the arc may cause current impulses through the capacity 31 and the coil 35 of the relay 32, and the operation of the relay through the medium of the resistance 29 influences the voltage of the alternator 25 and consequently the operation of the electromagnetic feeding device of the hand tool. This influence is such that it tends to maintain an arc of a substantially constant length regardless of the rate of consumption of the welding rod.

The increments of advance of the welding rod may be adjusted, of course, by altering the position of the adjusting nut 20 of the hand tool which acts to limit the movement of the armature carrying the one-way clutch away from the coil. Thus, by adjusting this nut 20 and the relay spring 37, the amount and rate of advance of the welding rod may be regulated so that an arc of substantially constant length may be maintained.

From the foregoing it is obvious that we have provided an arc welding apparatus wherein an advancing medium is provided capable of advancing the welding rod toward the work in increments of advance at a rate substantially equalling the rate of consumption of the rod so that a substantially constant arc length may be maintained.

While we have disclosed preferred embodiments of our invention it is to be understood that it may be embodied in various other forms without departing from our invention as defined in the appended claims.

Having thus described our invention, what we claim and desire to secure by Letters Patent is:

1. A welding apparatus, an arc circuit therefor electrically connected with the work and the welding rod, said apparatus including an electrically operated reciprocable welding rod advancing medium directly engaging the welding rod and capable of advancing the rod toward the work on alternate strokes.

2. A welding apparatus, an arc circuit therefor electrically connected with the work and with the welding rod, said apparatus including an electrically actuated welding rod feed mechanism provided with reciprocating means to directly engage the rod and advance the same toward the work only during one portion of its cycle of operation and unaffecting the position of the rod during the remainder of its cycle of operation, and a circuit arranged in parallel with the arc circuit to operate said electrically actuated feed mechanism for operating the latter.

3. A welding apparatus including a device for receiving and supporting a welding rod, and an electrically operated reciprocable medium included in said device for directly engaging said welding rod and advancing the same during one stroke of its cycle of operation.

4. A welding apparatus including a device for receiving and supporting a welding rod, an electromagnetically operated reciprocable welding rod advancing medium incorporated in said device and directly engaging the welding rod and capable when in operation of advancing the rod on alternate strokes and unaffecting the position of the rod on opposite strokes.

5. A welding apparatus including a device for receiving and supporting welding rod, an electromagnetically operated reciprocable welding rod advancing medium incorporated in said device and capable when in operation of advancing the rod on alternate strokes and unaffecting the position of the rod on opposite strokes, and gripping means included in said device for gripping and holding the rod stationary during the ineffective strokes of said advancing medium.

6. A portable hand tool for a welding apparatus, said hand tool including an electrically controlled reciprocable welding rod advancing medium directly engaging the welding rod and capable of advancing the rod on alternate strokes and unaffecting the rod on opposite strokes.

7. A portable hand tool for receiving and supporting welding rod and through which the welding rod is projected, an electrically operated welding rod advancing medium incorporated in said hand tool and capable of advancing the rod through said tool in increments of advance during one portion of each cycle of its operation and unaffecting the position of the rod during the remaining portion of each cycle of its operation, and means incorporated in the hand tool effective to maintain the rod stationary with respect to the hand tool during the ineffective portion of each cycle of operation of the advancing medium.

8. A portable hand tool for use in connection with welding apparatus, said hand tool comprising a body, a handle extending therefrom at right angles to the axis of said body, said body being capable of enabling welding rod to be projected coaxially therethrough, a one-way clutch mounted in the body for engaging the welding rod to advance the same in one direction during reciprocation of the clutch, means for reciprocating the clutch and means in the body for maintaining the rod stationary with respect to the body during the ineffective strokes of said one-way clutch.

9. A welding apparatus, an arc circuit therefor to be connected with the work and with a welding rod, a mechanism for receiving and supporting the welding rod, said mechanism including an electrically operated reciprocable welding rod advancing medium directly engaging the welding rod and capable of advancing the rod toward the work on alternate strokes and unaffecting the rod on opposite strokes, and a circuit associated with the arc circuit for actuating said welding rod advancing medium.

10. A welding apparatus, an arc circuit therefor to be connected with the work and with a welding rod a mechanism for receiving and supporting the welding rod, said mechanism including an electrically operated reciprocable welding rod advancing medium directly engaging the welding rod and capable of advancing the rod toward the work on alternate strokes and unaffecting the rod on opposite strokes, means for maintaining said welding rod stationary relative to said mechanism during the ineffective strokes of said advancing medium, and a control circuit arranged in parallel with the arc circuit for controlling said welding rod advancing medium.

11. A welding apparatus, a welding circuit therefor, said apparatus including a mechanism for receiving and supporting a welding rod, an electrically actuated reciprocating rod feeding medium directly engaging the welding rod and incorporated in said mechanism for engaging the rod and advancing the same during only one portion of its cycle of operation and unaffecting the position of the rod with respect to the mechanism during the remainder of its cycle of operation, gripping means included in said mechanism for gripping the rod during the ineffective strokes of said feeding medium to maintain the rod stationary relative to the mechanism during the ineffective strokes of said rod feeding medium, and electrical circuits arranged in parallel with the arc circuit for operating the rod feeding medium and controlling the operation thereof.

12. A welding apparatus, an arc circuit therefor electrically connected with the work and with a welding rod, said welding apparatus including a welding rod receiving and supporting mechanism, an electromagnetically operated reciprocating welding rod advancing medium directly engaging the welding rod and incorporated in said mechanism and capable of advancing the rod toward the work on alternate strokes and unaffecting the position of the rod on opposite strokes, means for imparting electrical impulses to said electromagnetically operated medium for operating the same, and means controlled by the characteristic of the arc for regulating said impulses.

13. A welding apparatus, an arc circuit therefor to be electrically connected with the work and with a welding rod, said apparatus including a mechanism for receiving and supporting welding rod relative to the work, said mechanism including an electrically operated welding rod feeding device engaging the rod and advancing the same only during one portion of its cycle of operation and unaffecting the rod during the remainder of its cycle of operation, an alternator for delivering electrical current to said device for operating the same, and a control circuit influenced by the frequency of metallic depositions between the welding rod and the work, said control circuit influencing the voltage of the alternator and consequently the operation of the feeding device.

14. In a welding apparatus, a reciprocable mechanism for engaging the welding rod to advance the same in one direction on alternate strokes and unaffecting the position of the welding rod on opposite strokes, electromagnetic means for operating said device, an arc circuit electrically connected with the welding rod and with the work, an alternator connected with said electromagnetic means for energizing the same, a resistance in the field of said alternator, a control circuit connected with the work and with the welding rod wherein electrical impulses are set up by metallic depositions between the rod and work, a condenser in said control circuit, a relay in said control circuit, said relay being adapted to interpose and remove said resistance from the circuit of the field of said alternator.

15. In welding apparatus, the combination of mechanism for feeding an electrode toward the work comprising means having only a back and forth reciprocatory movement operative to advance said electrode on every alternate stroke, and means for moving said reciprocable means in opposite directions.

16. In welding apparatus, the combination of mechanism for feeding an electrode toward the work comprising means having only a back and forth reciprocatory movement operative to advance said electrode on alternate strokes, and means for moving said reciprocable means in opposite directions, said last-mentioned means including at least one electrical device for positively moving said reciprocable means in one of said directions.

17. In welding apparatus, the combination of mechanism for feeding an electrode toward the work comprising an electromagnet having an armature, reciprocable means including said armature operative to advance said electrode on alternate strokes, and means for moving said reciprocable means in opposite directions, said last mentioned means including means for intermittently energizing and de-energizing said electromagnet sufficiently to attract said armature and move said reciprocable means in one of said directions.

18. In welding apparatus, the combination of mechanism for feeding an electrode toward the work comprising reciprocable means operative to advance said electrode on alternate strokes, means for moving said reciprocable means in opposite directions including an electrical device associated therewith, and means for intermittently energizing and de-energizing said electrical device sufficiently to move said reciprocable means in one of said directions and subsequently to permit movement thereof in the opposite direction.

19. In welding apparatus, the combination of mechanism for feeding an electrode toward the work comprising an electromagnet having a reciprocable armature at one end thereof provided with an aperture through which said electrode extends, means including said reciprocable armature operative to advance said electrode on alternate strokes, and means for moving said reciprocable armature in opposite directions, said moving means including means for intermittently energizing and deenergizing said electromagnet sufficiently to attract said reciprocable armature and move the same in one of said directions.

20. In welding apparatus, the combination of mechanism for feeding an electrode toward the work comprising an electromagnet having a core and a reciprocable armature disposed at one end thereof provided with an aperture in alignment with the core, said electrode being adapted to extend through the core and the aperture, means including said reciprocable armature cooperating with said electrode for effecting movement thereof on alternate strokes, and means for moving said reciprocable armature in opposite directions, said moving means including means for intermittently energizing and de-energizing said electromagnet sufficiently to attract said reciprocable armature and move the same in one of said directions.

21. In welding apparatus, the combination of mechanism for feeding an electrode toward the work comprising reciprocable means arranged to apply its force in line with the electrode being fed and operative to advance the same on alternate strokes, and means for moving said reciprocable means in opposite directions.

22. In welding apparatus, the combination of mechanism for feeding an electrode toward the work comprising an electromagnet having an armature, reciprocable means including said armature arranged to apply its force in line with the electrode being fed and operative to advance the same on alternate strokes, and means including said electromagnet for moving said reciprocable means in opposite directions.

23. In a welding system, the combination of a welding circuit including a movable electrode and the work, mechanism for feeding an electrode toward the work comprising reciprocable means arranged to apply its force in line with the electrode being fed and operative to advance the same on alternate strokes, and means for moving said reciprocable means in opposite directions, said moving means including an electrical device and a control circuit connected thereto and responsive to an electrical condition of said welding circuit for moving said reciprocable means in at least one of said directions.

24. In a welding system, the combination of a welding circuit including a movable electrode and the work, mechanism for feeding said electrode toward the work comprising means having only a back and forth reciprocatory movement operative to advance said electrode on alternate strokes, and means for moving said reciprocable means in opposite directions, said moving means including at least one electrical device, and means including a control circuit connected to said electrical device and responsive to an electrical condition of said welding circuit for positively moving said reciprocable means in at least one of said directions.

25. In a welding system, the combination of a welding circuit including a movable electrode and the work, mechanism for feeding said electrode toward the work comprising an electromagnet having a reciprocable armature at one end thereof provided with an aperture through which said electrode extends, means including said reciprocable armature operative to advance said electrode on alternate strokes, and means for moving said reciprocable armature in opposite directions, said moving means including a control circuit connected to said electromagnet and responsive to an electrical condition of said welding circuit for intermittently energizing and de-energizing the latter sufficiently to attract said armature and move the same in one of said directions.

26. In a welding system, the combination of a welding circuit including a movable electrode and the work, mechanism for feeding said electrode toward the work comprising an electromagnet having a reciprocable armature, means including said reciprocable armature cooperating with said electrode for advancing the latter on alternate strokes, means for moving said reciprocable armature in opposite directions, said moving means including a control circuit connected to said electromagnet and responsive to an electrical condition in said welding circuit for intermittently energizing and de-energizing said electromagnet sufficiently to attract said armature and move the same in one of said directions.

HARRY E. KENNEDY.
MAYNARD A. ROTERMUND.
LLOYD T. JONES.